(12) United States Patent
Ostermeier et al.

(10) Patent No.: US 7,765,781 B1
(45) Date of Patent: Aug. 3, 2010

(54) SCRAPPING PLATE FOR A COTTON PICKER

(75) Inventors: Charles Frederick Ostermeier, Slater, IA (US); Kevin Jacob Goering, Cambridge, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/395,855

(22) Filed: Mar. 2, 2009

(51) Int. Cl.
*A01D 46/16* (2006.01)
(52) U.S. Cl. .......................................... 56/41
(58) Field of Classification Search ............ 56/41, 56/28–50, 12.1, 36
See application file for complete search history.

(56) References Cited

U.S. PATENT DOCUMENTS

| | | | | |
|---|---|---|---|---|
| 3,528,232 A | * | 9/1970 | Fachini | 56/44 |
| 5,622,038 A | * | 4/1997 | Wigdahl et al. | 56/28 |
| 6,591,597 B1 | | 7/2003 | Stueck et al. | |
| 6,672,041 B1 | * | 1/2004 | Keeter | 56/41 |

* cited by examiner

*Primary Examiner*—Árpád Fábián-Kovács

(57) ABSTRACT

A scrapping plate includes alternating channels or pockets offset in the fore-and-aft direction relative each other to accommodate the different spindle paths associated with spindle bars having spindles which are non-aligned or offset at an angle relative to each other. The offset pockets provide optimal spacing between the different spindle paths and the plate to ensure maximum contact between the spindle picking ends and the cotton bolls to maximize overall picking efficiency. In one embodiment, the pockets are identical but offset in the spindle travel direction from each other and include leading and trailing ends which are angled or curved for conforming closely to the different spindle paths.

16 Claims, 6 Drawing Sheets

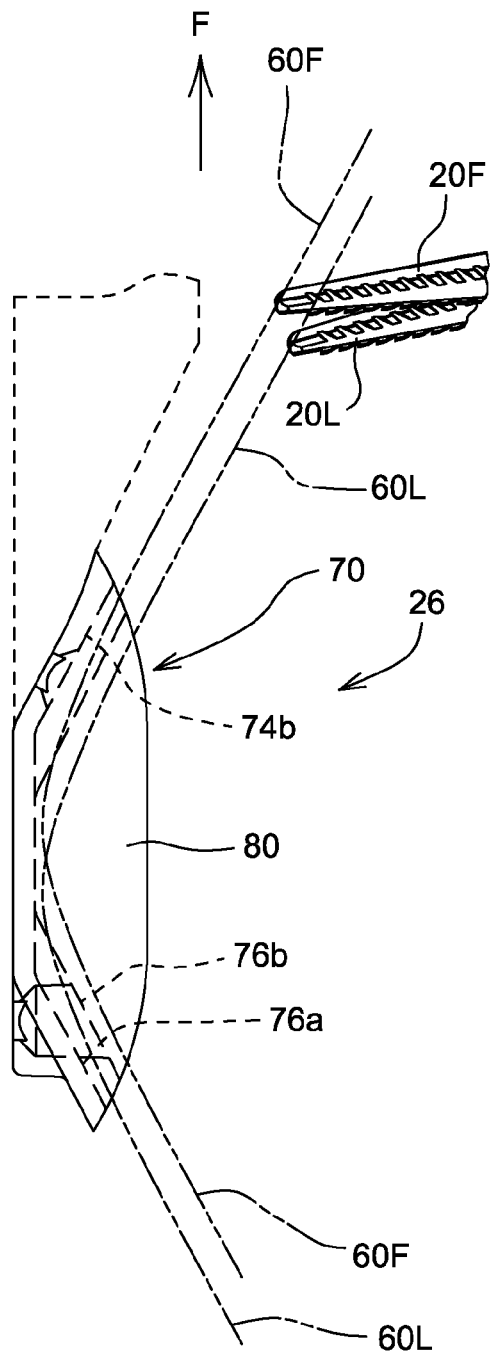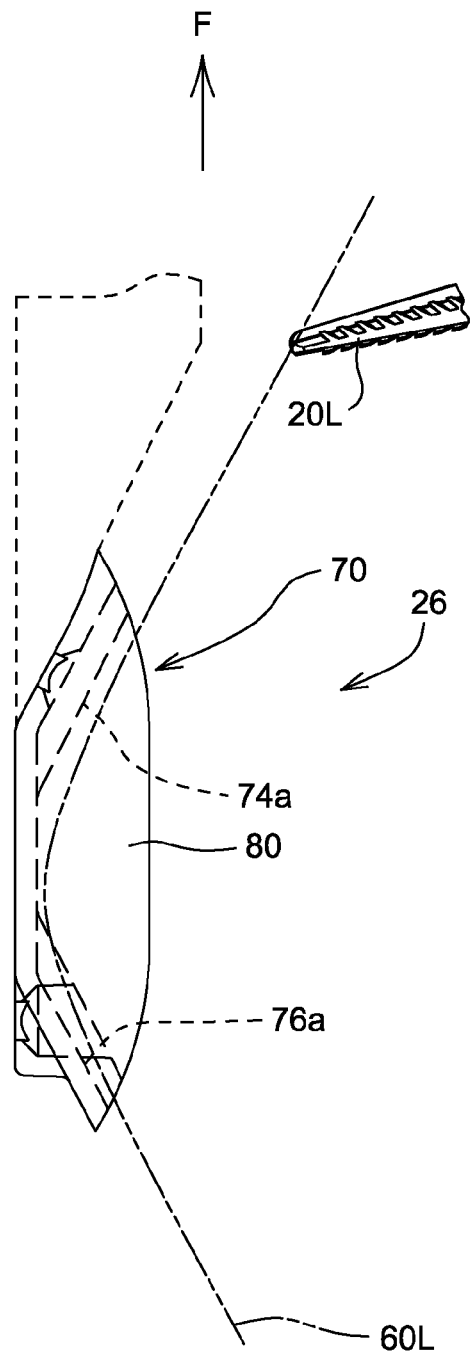
Fig. 6                    Fig. 7

SCRAPPING PLATE FOR A COTTON PICKER

FIELD OF THE INVENTION

The present invention relates generally to spindle-type cotton pickers and, more specifically, to scrapping plates for improving the picking efficiency of such pickers.

BACKGROUND OF THE INVENTION

Cotton pickers typically have picker bars with a number of uniformly spaced spindles orientated vertically in a straight line. The spindles project into the plant row and are rotated to remove cotton from the plants. The rearward velocity of the spindles is synchronized with the forward speed of harvester to generally provide zero relative velocity between the spindles and the cotton plants. To help assure contact with cotton bolls intermediate adjacent spindles, scrapping plates are placed adjacent the spindles in the picking zone to slow the intermediate bolls and force them into contact with the next spindles. Scrapping plates of the type described in commonly assigned U.S. Pat. No. 6,591,597 contain pockets of a common profile aligned in a single straight line to conform properly to the straight line picker bar design. The intermediate bolls are forced into contact with the spindles so those bolls are not left on the plant. Picking efficiency is increased without inhibiting plant movement through the picking zone so that harvest speed can be maintained for good machine productivity.

Recently, cotton picker bars have been developed that include spindles oriented at an angle to each other rather than spaced in a straight line. Such a bar is described, for example, in copending and commonly assigned U.S. patent application Ser. No. 12/241,748 entitled Offset Spindle Cotton Picker Bar, filed 30 Sep. 2008. In another copending and commonly assigned U.S. patent application Ser. No. 11/058,150 entitled High Density Cotton Picker Bar and Spindle Assembly Therefor, filed 15 Feb. 2005, a picker bar is described having sets of spindles which are non-aligned in the vertical direction so that spindles density can be increased. The path of travel of the spindle, or spindle tip path profile, is different for the leading spindles compared to the lagging spindles on a non-aligned spindle type of bar. Use of prior art style scrapping plates wherein pockets are of equal size and of uniform position results in less than optimum picking performance with such non-conventional spindle bars. The prior art scrapping plate must be centered between the two spindle paths, which results in excessive distances between the leading or lagging spindle path and the respective lagging and leading surfaces of the pockets. Decreased picking performance results because the increased distance between the spindle and the plate correlates to decreased proximity between the cotton boll and the picking spindle.

SUMMARY OF THE INVENTION

It is therefore an object of the present invention to provide an improved scrapping plate for cotton picker spindles which are non-aligned in the vertical direction on a picker bar. It is yet another object to provide such a scrapping plate which overcomes most or all of the aforementioned problems.

It is a further object to provide an improved scrapping plate for use with spindle bars having non-aligned spindle paths for optimizing picking efficiency. It is yet another object to provide a scrapping plate that maintains proper clearance for each row of spindles as the spindles pass the plate.

A scrapping plate includes alternating offset pockets or channels with offset positions relative each other to accommodate the different spindle paths associated with spindle bars having spindles which are non-aligned or offset at an angle relative to each other. The offset pockets or channels provide optimal spacing between the different spindle paths and the plate to ensure maximum contact between the spindle and the cotton boll. By maintaining proper positioning and clearance between the spindle paths and the pockets of the scrapping plate, picking efficiency is maximized. The offset also gives smoother flow and reduced peak loads in the power train.

These and other objects, features and advantages of the present invention will become apparent from the description and drawing.

BRIEF DESCRIPTION OF THE DRAWINGS

FIG. 6 is a top view generally showing the spindle tip paths of the leading and trailing spindles on a picker bar through the improved scrapping plate of FIGS. 4 and 5.

FIG. 7 is a view similar to FIG. 6 more clearly showing the path of the leading spindle through the associated channel of the scrapping plate.

DESCRIPTION OF THE PREFERRED EMBODIMENT

Figure 1:
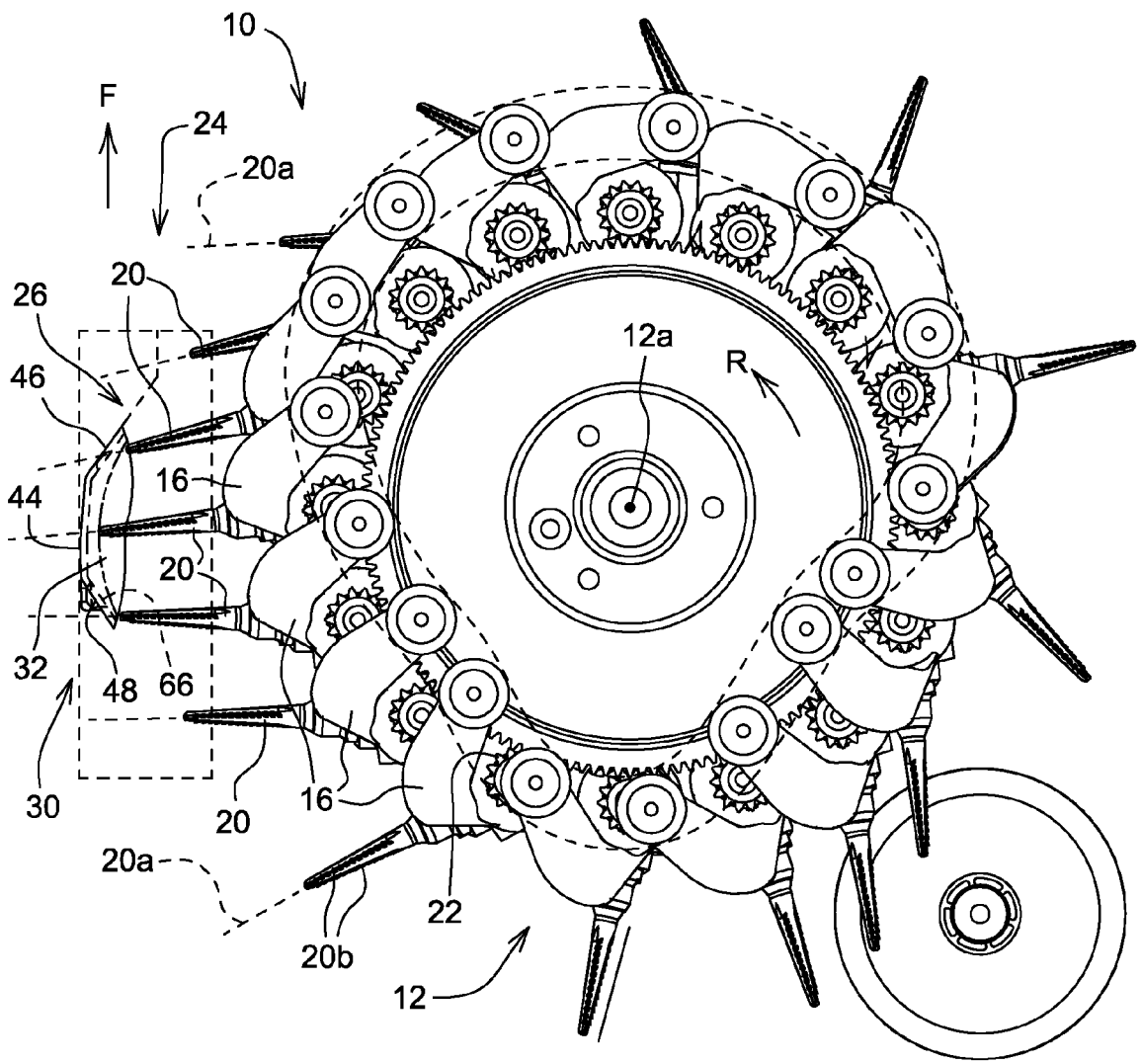
FIG. 1 is top view of a portion of a portion of a cotton picker row unit having conventional spindle picker bars with vertically aligned spindles and a conventional scrapping plate.

Referring to FIG. 1 (prior art) therein is shown a portion of a cotton picker row unit 10 having a rotating picker drum 12 with upright picker bars 16. A plurality of vertically aligned cotton picker spindles 20 are mounted for rotation about spindle axes 20a by a conventional spindle drive 22. As the row unit 10 is moved in the forward direction F, a row of cotton plants enters a crop receiving area 24 and is engaged by the rotating spindles 20 in a picking zone 26. The drum 12 is rotated in direction R about a drum axis 12a at a speed synchronized to the row unit forward speed so that the rearward speed of the spindles 20 is approximately equal to the forward speed of the row unit, and the velocity of the spindles in the picking zone 26 relative to the cotton plants approaches zero. The rotating spindles 20 include barbed areas 20b that engage and snag the cotton bolls and remove the cotton from the plants.

To increase picking efficiency, a scrapping plate 30 is provided which helps force cotton into the spindles 20 before being released from the plate. Such a scrapping plate is shown and described on commonly assigned U.S. Pat. No. 6,591,597. The plate 30 includes a plurality of vertically spaced ribs 32 extending into the zone 26 between the ends of the spindles 20. The ribs 32 are supported from a base portion 44 which includes a forward angle 46. A rear angle 48 maintains the cotton in the picking zone longer and helps force the cotton onto the spindle 20. As the spindle 20 exits the plate area, the spindle tip is closely adjacent the base portion 44.

In the structure described in the aforementioned U.S. patent application Ser. No. 12/241,748 entitled Offset Spindle Cotton Picker Bar, a spindle bar 50 (FIG. 3) with nonaligned spindles 20L and 20F defines offset spindle paths 60L and 60F with the corresponding spindles 20L leading the spindles 20F. The spindle paths 60L and 60F fail to conform to aligned channels in the scrapping plate 30 of FIGS. 1 and 2, with the leading spindles 20F offset outwardly from the entry area of the plate 30 and the trailing spindles 20F offset outwardly from the exit area of the plate 30. Such offsets result in inefficient scrapping plate action and reduced machine productivity.

Figure 3:
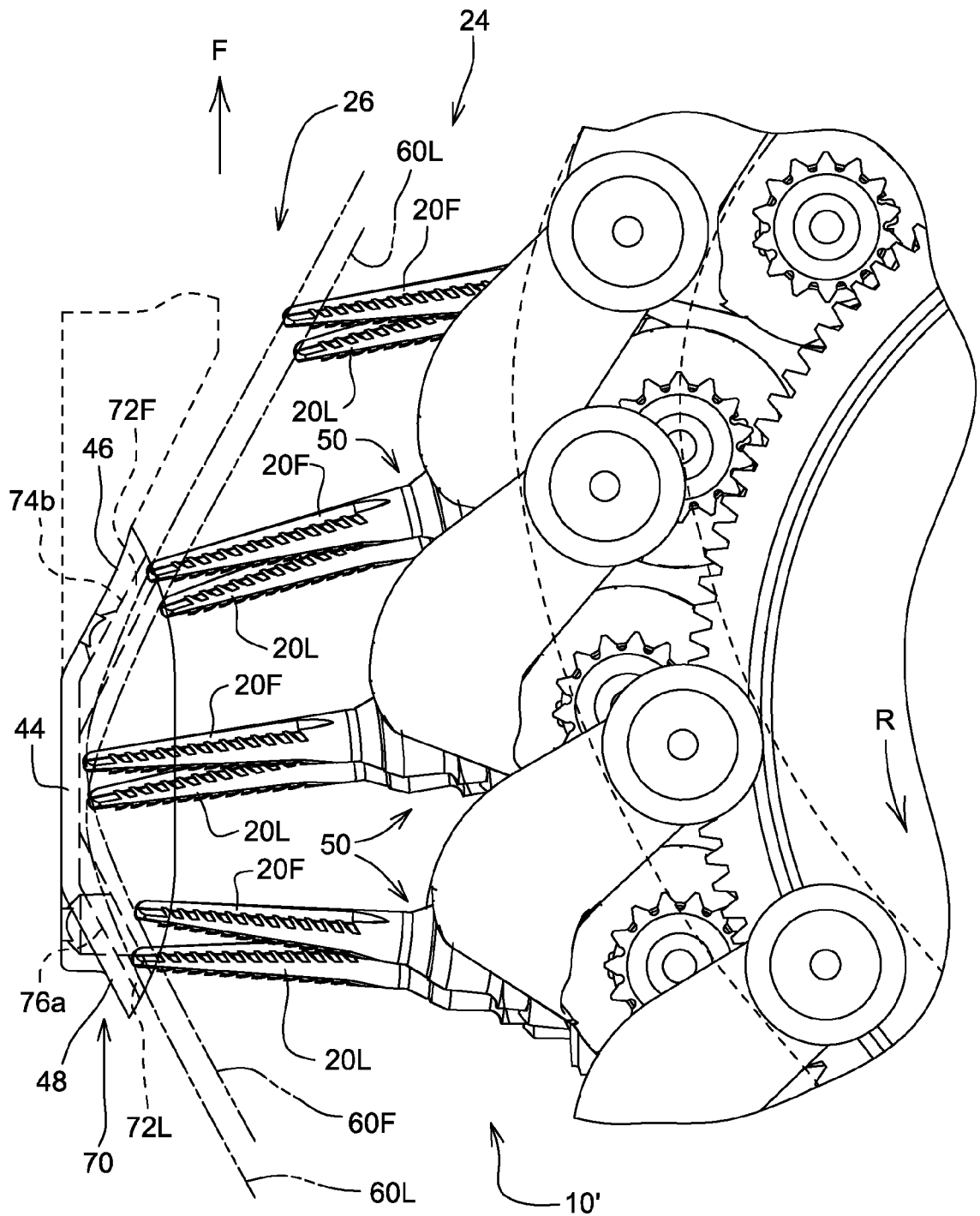
FIG. 3 is a view similar to FIG. 2 but showing spindle picker bars having nonaligned spindles and the improved scrapping plate therefor.
Figure 4:
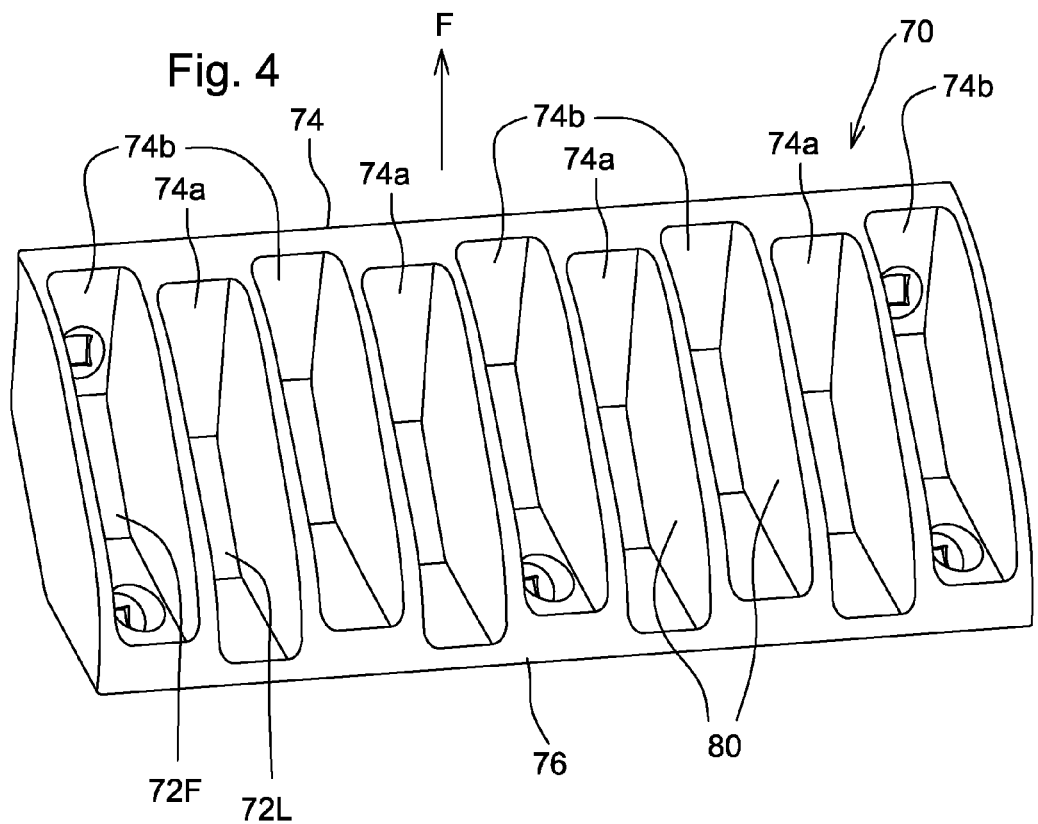
FIG. 4 is a perspective view of the improved scrapping plate for use with spindle bars having nonaligned spindles.
Figure 5:
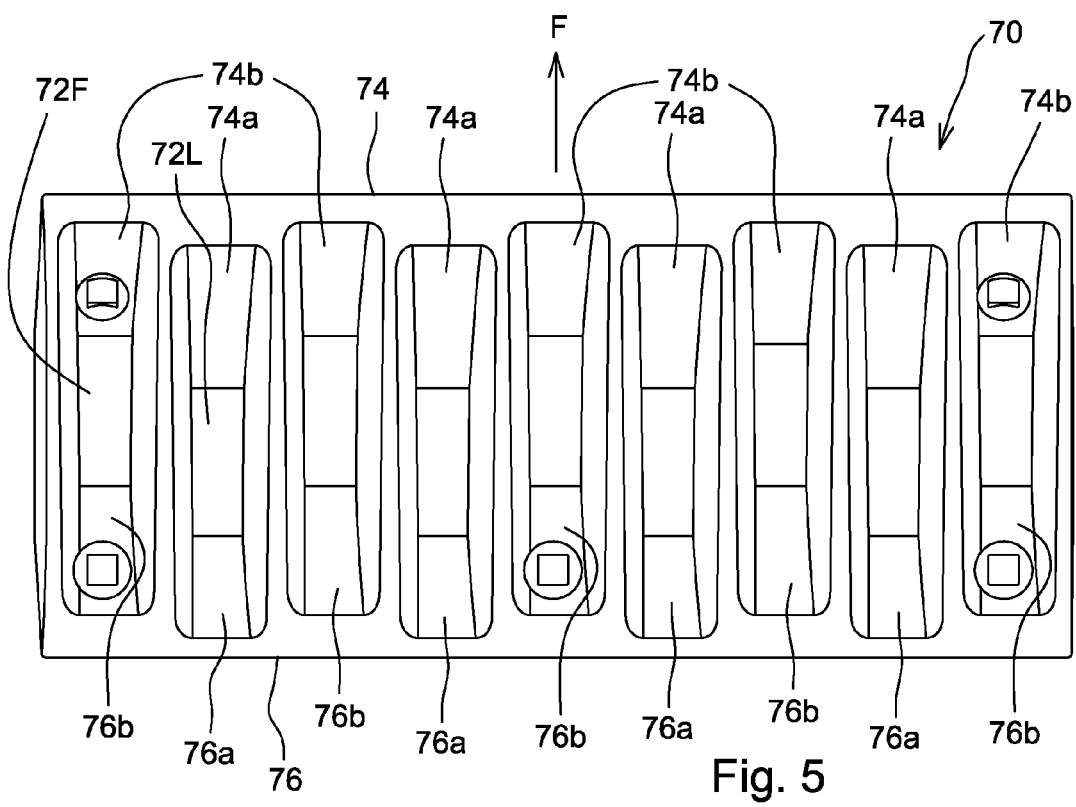
FIG. 5 is a plan view of the scrapping plate of FIG. 4.
Figure 8:
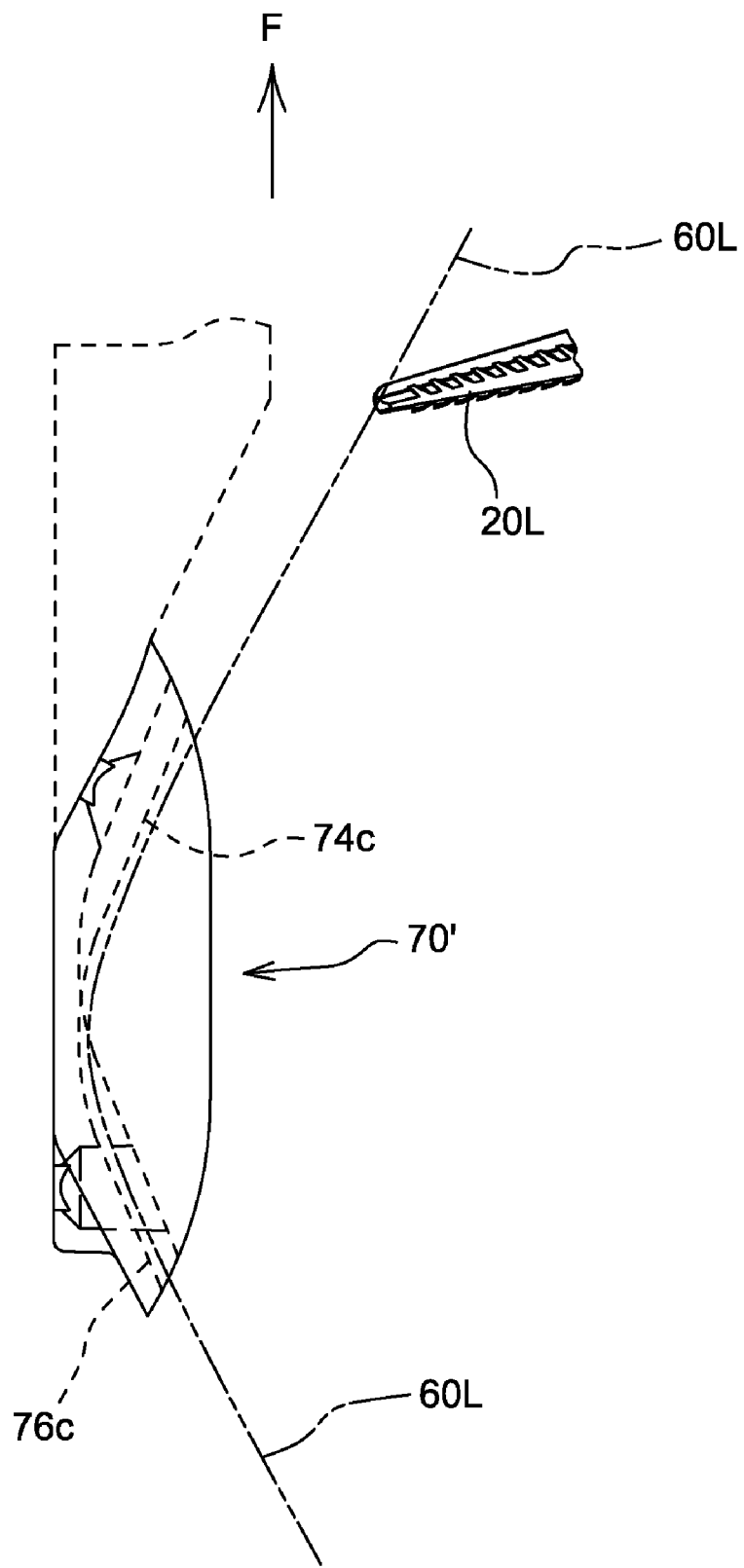
FIG. 8 is a view similar to FIG. 7 but illustrating a scrapping plate having a curved channel or pocket.

Referring now to FIGS. 3-5, an improved scrapping plate 70 is shown having offset pockets or channels 72L and 72F to define channel areas that conform to the paths 60L and 60F. The pockets or channels 72L and 72F are parallel and generally horizontal and extend from a leading end 74 to a trailing end 76 for receiving picking surfaces of the outer ends of the spindles 20L and 20F therein while the spindles are in the harvest zone 26. The channels 72L and 72F direct cotton against the spindles and include angled or otherwise tapered exit areas 76a and 76b at the trailing ends for forcing the cotton into the spindle as the spindles exits the channel areas. As can be seen in FIGS. 4 and 5, the angled exit area 76a of a first channel 72L is offset in the travel direction, that is, fore-and-aft, from the angled exit area 76b of an adjacent second channel 72F to conform to the paths 60L and 60F and maintain the spindle ends in close proximity to the lowermost portions of the channels 72L and 72F while the spindles are in the picking zone 26. As shown, adjacent or first and second channel areas are generally identical, and the first channel area is offset in the spindle travel direction from the second channel area. The channels 72L include angled entry areas 74a and the channels 72F include similar but offset angled entry areas 74b. The pockets 72L and 72F may also be formed in a curved configuration (see 74c and 76c of scrapping plate 70' of FIG. 8) or with a combination of curved and straight portions to generally conform to the spindle travel paths.

Figure 2:
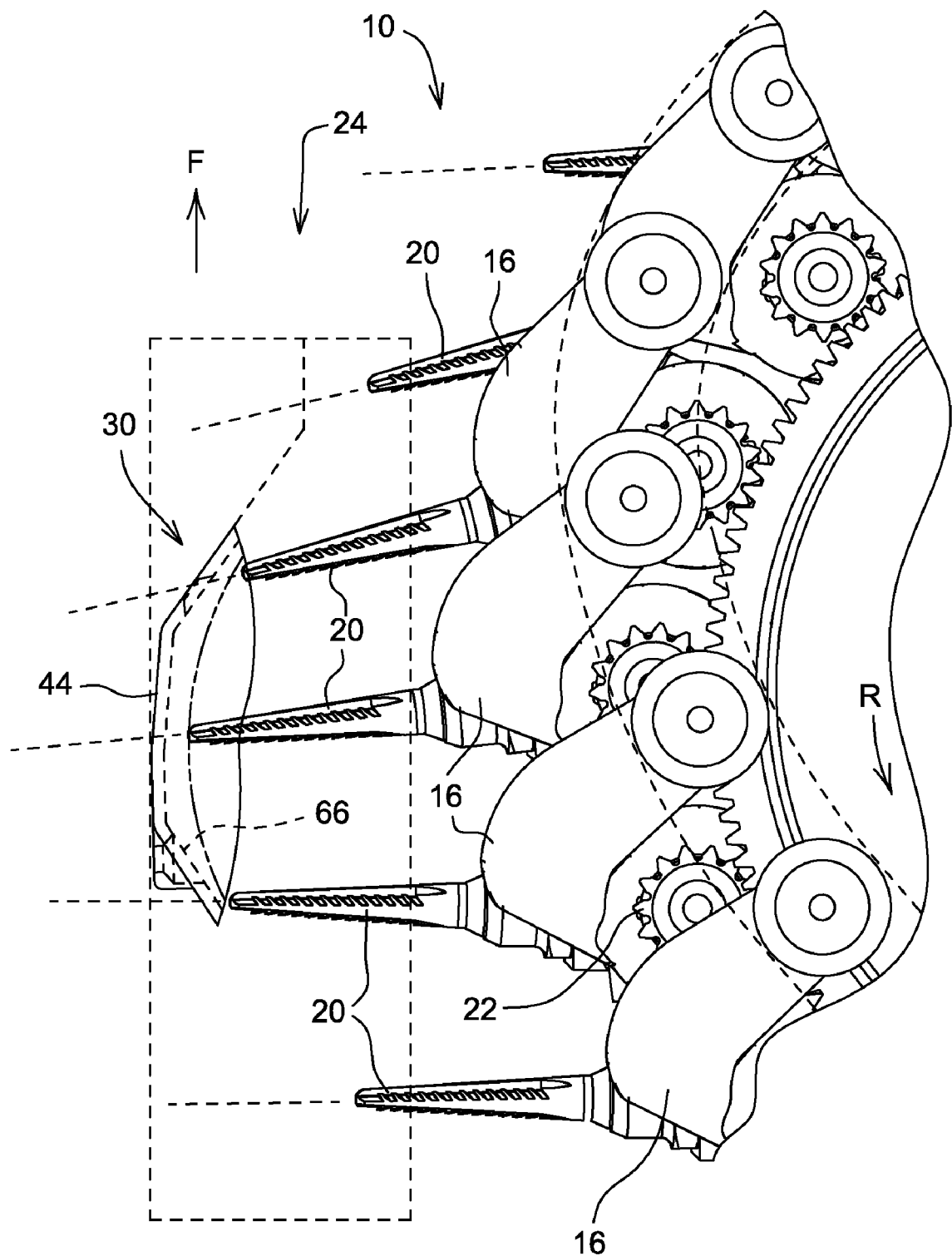
FIG. 2 is an enlarged view of the scrapping plate area of the row unit of FIG. 1.

As shown, a plurality of alternating offset channels 72L and 72F with tapered walls 80 are formed in a unitary scrapping plate casting or molded plastic or composite structure, with the channels being generally identical in shape to conform to spindle paths for alternating offset spindles 20L and 20F. However, the channels may also be formed such that they open in the forward direction F rather than including the angled entry areas 74a and 74b. In addition, the channel fore-and-aft offset pattern can be arranged to accommodate different spindle paths for different spindle bar configurations. For example, if the spindles on a spindle bar are arranged in three different vertical planes, rather than in two planes as shown in FIGS. 2, 5 and 6, three channel offsets can be provided in the scrapping plate to conform to the three different spindle paths.

Having described the preferred embodiment, it will become apparent that various modifications can be made without departing from the scope of the invention as defined in the accompanying claims.

The invention claimed is:

1. A scrapping plate for a spindle type cotton harvester row unit having vertically spaced spindles moveable generally horizontally in spindle travel paths in a horizontally disposed spindle travel direction through a harvest zone in contact with cotton plants, the plate including generally horizontally extending adjacent first and second channel areas, the channel areas extending from a leading end to a trailing end of the plate for receiving picking surfaces of the spindles therein while the spindles are in the harvest zone, the channel areas directing cotton against the spindles, wherein the channel areas include exit areas at the trailing end of each of the first and second channels areas for forcing the cotton into the spindle as the spindles exits the channel areas, wherein the exit area of the first channel area is offset in the travel direction from the exit area of the second channel area, and wherein the first and second channel areas are generally identical and the first channel area is offset in the spindle travel direction from the second channel area.

2. The scrapping plate as set forth in claim 1 wherein channel areas include entry areas generally conforming to the travel paths of the spindles.

3. The scrapping plate as set forth in claim 1 wherein the exit areas are tapered outwardly towards the spindles.

4. A scrapping plate for a spindle type cotton harvester row unit having vertically spaced spindles moveable generally horizontally in spindle travel paths in a horizontally disposed spindle travel direction through a harvest zone in contact with cotton plants, the plate including generally horizontally extending adjacent first and second channel areas, the channel areas extending from first and second leading ends to corresponding first and second trailing ends of the plate for receiving picking surfaces of the spindles therein while the spindles are in the harvest zone, the channel areas directing cotton against the spindles, wherein the channel areas include exit areas at the first and second trailing ends of the first and second channel areas for forcing the cotton into the spindle as the spindles exit the channel areas, wherein the first exit area of the first channel area is offset in the travel direction from the second exit area of the second channel, wherein channel areas include first and second entry areas generally conforming to the travel paths of the spindles, and wherein the first channel area is offset in the spindle travel direction from the second channel area.

5. The scrapping plate as set forth in claim 4 wherein the first entry area of the first channel area is offset in the travel direction from the second entry area of the second channel area.

6. The scrapping plate as set forth in claim 5 wherein the first and second channel areas are generally identical.

7. The scrapping plate as set forth in claim 4 wherein the first and second channel areas include a base portion and walls extending towards the spindles from the base portion, wherein the base portion between the walls is curved to approximate shapes of the spindle travel paths.

8. A scrapping plate for a spindle type cotton harvester row unit having cotton picking spindles vertically spaced on a spindle bar, the spindles having angularly offset ends moveable in a spindle travel direction through a harvest zone in offset paths with spindles in one of the offset paths leading the spindles in the other of the offset paths, the plate including a plurality of channel areas, each of the channel areas including a leading end and a trailing end for receiving the picking tip end of the spindle therebetween and directing cotton against the spindle, wherein the channel areas for the spindles in a first one of the offset paths is offset in the spindle travel direction relative to the channel areas for the spindles in a second one of the offset paths for forcing the cotton into the spindles prior to the spindle exiting the channel areas; wherein the trailing ends of the channel areas include spindle exit areas angling outwardly to generally follow the offset paths, the spindle exit areas being offset in the spindle travel direction relative to each other; wherein the channel areas include a flat central floor with sidewalls, and the trailing ends are tapered outwardly relative to the central floor; and wherein the leading ends of the channel areas are tapered outwardly and adjacent leading ends are offset in the spindle travel direction relative to each other to conform to the offset paths.

9. The scrapping plate as set forth in claim 8 wherein the channel areas are generally identical.

10. A scrapping plate for a spindle type cotton harvester row unit having vertically spaced spindles, the spindles moveable generally horizontally in spindle travel paths in a horizontally disposed spindle travel direction through a harvest zone in contact with cotton plants, the plate including generally horizontally extending adjacent first and second pocket areas, each of the pocket areas having adjacent walls with a base portion connecting the walls, the pocket areas extending from leading ends to a trailing ends for receiving picking surfaces of the spindles therein between the walls while the spindles are in the harvest zone, the pocket areas directing cotton against the spindles, wherein the trailing ends define spindle exit areas with the base portion between the walls at the trailing ends angling outwardly towards the spindle for forcing the cotton into the spindle as the spindles exits the channel areas, wherein the base portion at the trailing end of the first pocket area is offset in the travel direction from the base portion at the trailing end of the second pocket area.

11. The scrapping plate as set forth in claim 10 wherein the pocket areas generally conform to the travel paths of the spindles.

12. The scrapping plates as set forth in claim 10 wherein the pocket areas are substantially identical in shape and the second pocket area is offset in the spindle travel direction from the first pocket area.

13. The scrapping plate as set forth in claim 12 wherein the pocket areas generally conform to the travel paths of the spindles.

14. The scrapping plate as set forth in claim 12 wherein the leading areas of the pocket areas define outwardly angling spindle entry areas.

15. The scrapping plate as set forth in claim 10 wherein the base portion between the walls is curved outwardly to conform the pocket areas to the spindle travel paths.

16. The scrapping plate as set forth in claim 10 wherein the leading and trailing ends are curved.

* * * * *